Patented Feb. 29, 1944

2,342,739

UNITED STATES PATENT OFFICE 2,342,739

CASEIN SHEET

Edouard M. Kratz, Ogden Dunes, Ind., assignor to Kraft Cheese Company, a corporation of Delaware No Drawing. Application July 12, 1941, Serial No. 402,227

2 Claims. (Cl. 106—147)

The present invention relates to casein dispersions and improved transparent casein sheet or wrapping materials made therefrom.

Various types of animal and vegetable casein compositions have been suggested for use heretofore in the preparation of casein film or sheet materials. These prior compositions, however, have not been found completely satisfactory for use in the preparation of casein sheets. Prior sheets, made from such compositions for example, have been found to be relatively low in strength and to have a tendency to turn brittle on aging.

In the research investigation upon which the present invention is based it was discovered that a part of the complex casein composition seeded out of the dispersion ahead of the main mass. It was also discovered that this seeding or premature conglomeration of the alpha or beta protein contained in the casein composition was responsible for inferior film or sheet formation.

After a detailed research investigation I discovered that satisfactory dispersions for use in the production of improved sheet material could be prepared by using a small amount of a compound represented by the following formula:

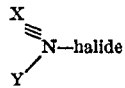

where X represents (3) lower alkyl groups or a lower cyclic hydrogen carbon group and Y represents a higher acyl or a higher alkyl group.

The following preferred example will serve for illustrative purposes. About 60 pounds of finely ground milk or soya casein are added to about 450 pounds of water warmed to about 100° F. and the resulting water-casein mixture allowed to stand with agitation for about 20 minutes. About 3 pounds of glycollic acid and 6 pounds of a 50 per cent solution of lactic acid are next added along with about 11.5 pounds of glycerine. The acid mixture is then heated to about 180° F. and subjected to agitation until the casein forms a homogenous dispersion.

Agitation is continued and to the acid dispersion or solution is next added about 7.5 pounds of diethanolamide of formic acid along with about 343 grams of aluminum formate. About 920 cc. of 40 per cent aqueous formaldehyde and about 150 grams of stearyl pyridinium bromide are finally added with agitation. The resulting dispersion after filtering is then ready for casting in the usual manner and forms improved transparent sheet material of the type desired.

In place of the lower hydroxy aliphatic acids used in the above example other acids or acid mixtures such as formic and levulinic acids may be employed if desired. Ordinarily the use of a substantial proportion of lower aliphatic hydroxy or keto acids is preferred. Also in place of the acid dispersing agents used in the example various caustic alkali or amine bases may be used if desired. However, when using an alkaline dispersing agent the amount used should be sufficient only to provide necessary dispersion. The presence of substantial amounts of excess alkali with resulting high pH values has been found objectionable in the dispersions of the present invention.

The alkanolamide of formic acid is employed as a plasticizing agent and the aluminum formate and formaldehyde are employed to set up or insolubilize the sheet or film after casting. Other plasticizing agents and other insolubilizing agents or combinations thereof may be used although the particular combination set forth in the example has been found to give with acid dispersions a particularly good sheet of the type desired.

The stearyl pyridinium bromide for which may be substituted other higher acyl as well as higher alkyl (e. g. lauryl, cetyl, etc.), pyridinium halides is used to improve the dispersion and to prevent premature seeding. In place thereof or in combination therewith small amounts (e. g. 1.5 per cent) of a tri-lower alkyl, higher acyl or higher alkyl ammonium halide may be used as they also have been found to yield improved dispersions with superior sheet formation. Examples of tetra-substituted ammonium salts are the trimethyl, stearyl ammonium bromide; the triethyl or tripropyl, lauryl or cetyl ammonium chlorides, etc. Examples of cyclic substituted salts are the tetra and octa decyl pyridinium chlorides; the palmityl pyridinium bromide, etc.

It is not understood just why the N-halide compounds substituted (a) with lower alkyl groups or a lower cyclic hydrocarbon group and (b) with a higher acyl or higher alkyl group act to prevent premature seeding during casting. Investigations, however, indicate that they change or modify the ionic charge on the protein complexes to produce homogeneous dispersions of the desired stability.

It will be understood that the present invention is not limited by theoretical explanation or to the illustrative examples described above. All modifications of the present invention are intended to be covered by the following claims.

I claim:

1. A glycollic and lactic acid dispersed casein sheet plasticized by the diethanolamide of formic acid and insolubilized by formaldehyde, and having dispersed therein a small amount of a compound selected from the group consisting of higher acyl and higher alkyl pyridinium halides.

2. A glycollic and lactic acid dispersed casein sheet plasticized by the diethanolamide of formic acid and insolubilized by formaldehyde, and having dispersed therein a small amount of stearyl pyridinium bromide.

EDOUARD M. KRATZ.